United States Patent [19]
McLean et al.

[11] Patent Number: 5,099,685
[45] Date of Patent: Mar. 31, 1992

[54] BOUNDARY LAYER CONTROL DIFFUSER FOR A WIND TUNNEL OR THE LIKE

[75] Inventors: James D. McLean, Seattle; Peter P. Sullivan, Renton, both of Wash.

[73] Assignee: The Boeing Company, Seattle, Wash.

[21] Appl. No.: 565,802

[22] Filed: Aug. 9, 1990

[51] Int. Cl.$^5$ .............................................. G01M 9/00
[52] U.S. Cl. ........................................................ 73/147
[58] Field of Search ........................ 73/147; 239/553.5

[56]  References Cited

U.S. PATENT DOCUMENTS

| | | | |
|---|---|---|---|
| 2,709,917 | 6/1955 | Bruynes | 73/147 |
| 2,729,974 | 1/1956 | Lee et al. | 73/147 |
| 2,948,148 | 8/1960 | D'Anfreville et al. | 73/147 |
| 3,000,401 | 9/1961 | Ringles | 138/39 |
| 3,049,005 | 8/1962 | Frenzel | 73/147 |
| 3,981,144 | 9/1976 | Milling et al. | 73/147 |
| 3,998,393 | 12/1976 | Petty | 239/553.5 |
| 4,515,524 | 5/1985 | Fisher, Jr. | 415/219 R |

OTHER PUBLICATIONS

"Incompressable Aerodynamics", by D. Thwarites, published by Dover Publications, Inc. New York 1958.
"Integrated Hull Design, boundary-layer Control & Propulsion of submerged Bodies: Wind tunnel Verification", AIAA Paper 82-1204 SIAA/SAE.ASME 18th Joint Propulsion Conference, Jun. 1982.
Separation Control by Trapped Vortices, by F. O. Rinegloeb, published in "Boundary Layer and Flow Control", G. V. Lockmann, editor, Pergamon Press, 1984.
"Tests in the N.P.L. Electric Tank of a 4:1 Axi-symmetrical Diffuser Having a Discontinuity in the Wall Velocity", by F. Cheers, and W. G. Rayner, published 1950 by London: His Majesty's Stationary office.
"An Improved Design Method & Experimental Performance of Two Dimensional Curved Wall Diffusers", by Tah-Teh Yang, W. G. Hudson & Ali M. El-Nashar of Clemsen University—Designated No. CR121024, Nov. 20, 1972.

Primary Examiner—Donald O. Woodiel
Attorney, Agent, or Firm—Hughes & Multer

[57]   ABSTRACT

A wind tunnel having a test section and a fan section, interconnected by two passageways to form a recirculating air flow through said sections. There is a diffuser immediately downstream of the test section, and a second diffuser immediately downstream of the fan section. Each diffuser has an intermediate flow section where the side wall extends radially outwardly in a downstream direction at a relatively sharp angle. At the upstream end of the intermediate section there is a peripheral suction slot to draw in boundary layer air, and a by-pass passageway to discharge the air tangentially in a downstream location of the diffuser. This enables a substantial reduction in air velocity in a relatively short axial length.

35 Claims, 5 Drawing Sheets

BOUNDARY LAYER CONTROL DIFFUSER FOR A WIND TUNNEL OR THE LIKE

BACKGROUND OF THE INVENTION

A. Field of Invention

The present invention relates to a diffuser by which an airflow can be reduced from a higher velocity to a lower velocity, and more particularly to such a diffuser used in a wind tunnel to bring the airflow from a higher velocity, lower static pressure condition to a lower velocity, higher static pressure condition for recirculation through the wind tunnel.

B. Background Art

In a conventional wind tunnel where air is driven by a main drive fan through a test section of the tunnel, it is necessary to pass the air through at least two diffuser sections. There is a first diffuser section which receives relatively high velocity air from the test section to cause the air to decrease in velocity (with a consequent increase in static pressure) so that this air can more effectively be moved by the drive fan in its recirculating pattern in the wind tunnel. There is also a fan diffuser section which receives the air from the main drive fan and passes this air through a settling chamber from which the air passes through a constricted passageway section into the test section at a relatively higher velocity. In the settling chamber area, the air may be passed through a cooling device to extract from the air the heat that results from being recirculated through the wind tunnel. There may also be a flow straightening device which is often in the form of a plurality of elongated passageways to provide a more uniform flow into the test section.

In a conventional wind tunnel, the requirements of the diffuser sections dictate to a large extent the overall tunnel circuit length. The main function of the diffuser sections is to decelerate the flow from its maximum velocity in the tunnel section to much lower velocities, and to recover as much as possible of the flow's original kinetic energy in the form of increased pressure. In a conventional diffuser, the deceleration and the associated pressure increase must be gradual, lest the boundary area separate from the diffuser wall, causing large energy losses and flow unsteadiness. Conventional conical diffusers without active boundary layer control are thus limited to included angles (i.e. the total angle between the walls) between five and seven degrees and must therefor be quite long. While maintaining attached flow through good design practice avoids the very large losses that would occur if the flow separated, it does not eliminate energy losses. The first diffuser section downstream of the tunnel test section in particular typically accounts for a substantial fraction of the power which must be supplied by the tunnel drive system.

Active boundary layer control offers the prospect of dramatically reducing the length of the diffuser sections and possibly reducing the diffuser energy losses by half or more. These advantages would be of most value in a large, pressurized wind tunnel, and would thus be most likely to justify increased mechanical complexity. In such a facility, the walls of the tunnel circuit constitute a very expensive pressure vessel structure, and shortening the circuit thus could have a large impact on initial costs.

Also, in large tunnels the cost of energy is an important factor in operating costs and the reduction in energy losses could produce substantial savings.

The two forms of active boundary layer control that have been proposed for use in diffusers are suction and tangential blowing.

In boundary layer suction schemes some of the lowest energy air adjacent to the wall (i.e at the "bottom" of the boundary layer) is removed through perforations or slots in the wall, thus delaying the flow reversal that characterizes separation. The boundary layer is then able to withstand a more abrupt pressure rise, and the diffuser can be made shorter. Substantial shortening of the diffuser, however, requires that suction be applied to a substantial part of the surface over which the pressure gradient is felt, and therefore the suction must be distributed over multiple holes or slots. Complex ducting schemes are required to handle the suction air efficiently (i.e. to minimize further energy losses), increasing the complexity of the diffuser wall structure. Even with good duct design the suction air tends to have low energy, partly because only the lowest energy air in the boundary layer is removed, and partly because the small scale slots or holes which are used in the schemes have significant losses of their own. The pumping power to return the suction air to the tunnel circuit can therefore be relatively large.

In tangential blowing schemes, a high velocity jet of air (called a wall-jet) is introduced through a slot upstream of the region of pressure rise. This high energy air mixes with the boundary layer and enables it to overcome a much more abrupt pressure rise without separating. A blown diffuser can thus be made shorter than a conventional one. However, this generally requires that the blowing jet have a velocity considerably greater than the general tunnel stream at the location of the blowing slot. In a transonic tunnel, where the flow velocity at the entrance to the diffuser is near the speed of sound, a supersonic blowing jet would probably be required. This would introduce a great deal of noise into the tunnel circuit, which is undesirable for a number of reasons.

Figures 1A, 1B:
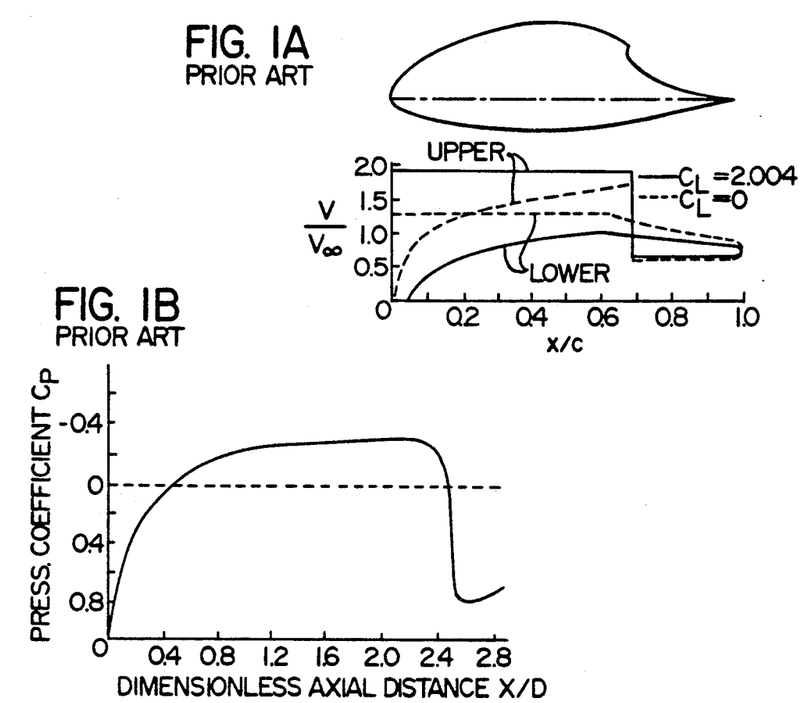
FIG. 1A is a cross-sectional view of a first embodiment of a prior art Griffith Airfoil.
FIG. 1B shows a pressure distribution curve of flow over the airfoil of FIG. 1A.
Figure 2A:
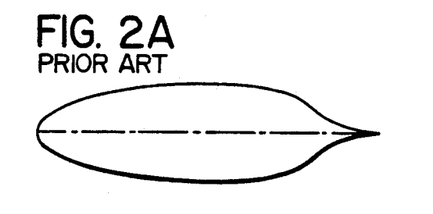
FIG. 2A is a further prior art configuration of the Griffith Airfoil.
Figure 2B:
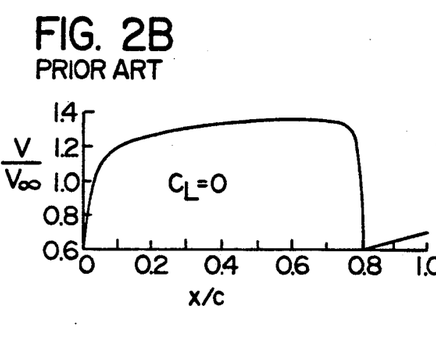
FIG. 2B shows the pressure distribution curves of the airfoil of FIG. 2A.

With regard to the overall problem of sustaining laminar boundary-layer flow, the so-called Griffith airfoils were first developed in the 1930's. The intent of these airfoils is to provide laminar boundary-layer flow over its entire surface in a manner to also achieve very low drag. The thought is that laminar flow could be maintained if the airfoil could be designed to have a favorable pressure gradient (accelerating flow) everywhere on its surface. A practically realizable airfoil shape with positive thickness, however, cannot have accelerating flow everywhere, and decelerating flow (a pressure rise) must be tolerated on the surface. The basic idea behind the concept is to shape the airfoil so as to concentrate the pressure rise in a very short region on the aft part on one or both surfaces. To prevent the boundary-layer separation that this sudden pressure rise would otherwise cause, a single boundary-layer suction slot is placed at the location of the pressure rise, where enough of the boundary-layer is removed so that the remaining flow can negotiate the pressure rise and attach itself to the surface aft of the slot. Two such airfoils are shown in FIGS. 1A and 2A, with FIGS. 1B and 2B showing the corresponding pressure distribution curves, these being taken from the work entitled "Incompressable Aerodynamics", D Thwarites, published by Dover Publications, Inc., New York 1958. Wind tunnel tests of the so-called Griffith airfoils demonstrated that the desired pressure distribution could be achieved in practice and that the minimum suction flow rate required to keep the flow attached agreed reasonably well with a theoretical criterion proposed by G. I. Taylor. However, the goal of full cord laminar flow was not realized because the concavity of the surface aft of the slot caused instability and transition to turbulence. Thus, although attached flow is achieved, the low drag levels originally predicted were not obtained.

Figure 3A:
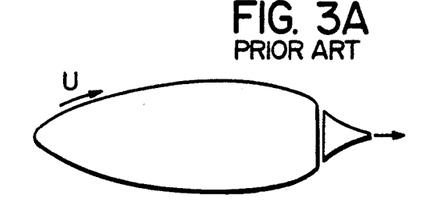
FIG. 3A is a longitudinal sectional view of a prior art device which is a body of revolution, illustrating the concept developed by F. Goldschmied.
Figure 3B:
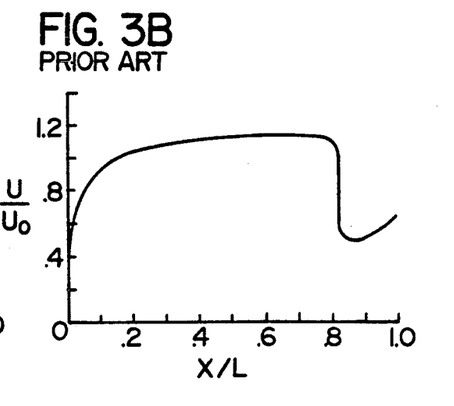
FIG. 3B is a pressure distribution curve of the device shown in FIG. 3A.

Later, the same concept was applied to a body of revolution by F. Goldschmied, this being presented in "Integrated Hull Design, Boundary-layer Control and Propulsion of Submerged Bodies: Wind tunnel Verification", AIAA Paper 82-1204, AIAA/SAE/ASME 18th Joint Propulsion Conference, June, 1982. Wind tunnel tests of the Goldschmied body again showed that the type of pressure distribution required by the concept could be achieved in practice, and that Taylor's criterion again predicted the minimum suction rate reasonably well. FIG. 3A illustrates the Goldschmied configuration, with FIG. 3B presenting a pressure distribution curve for the same.

Figure 4:
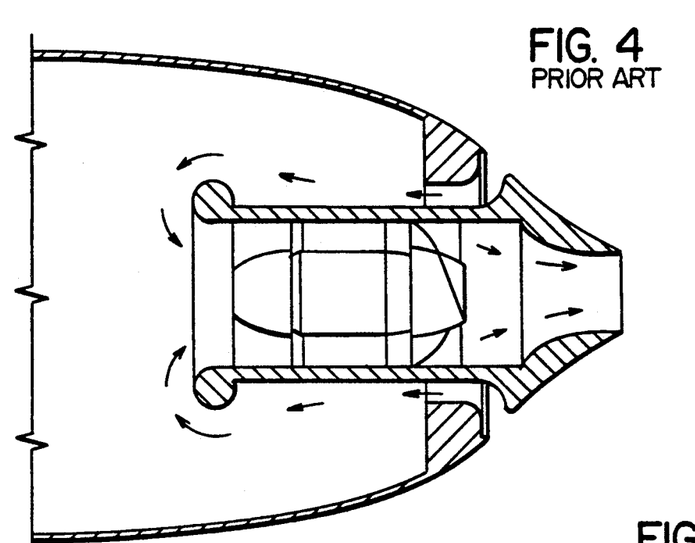
FIG. 4 is a sectional view taken along a longitudinal center axis of a prior art device, which is a surface of revolution, having an overall configuration similar to that shown in FIG. 3A, but incorporating the Ringloeb cusp.

A feature added by Goldschmied was that a Ringloeb cusp would be helpful in achieving steady flow in that slot. In one of his tests, Goldschmied deliberately tripped the boundary-layer to turbulent near the nose of the body and found that the concept could be made to work with a turbulent boundary-layer upstream of the slot. The thicker turbulent boundary-layer merely required a higher suction flow rate, as predicated by Taylor's criterion. This particular configuration is shown In FIG. 4 of this patent application. Reference is also made to the work, "Separation Control by Trapped Vorticies" of F. O. Rinegloeb, published in the work "Boundary Layer and Flow Control, G. V. Lockmann, editor, Pergamon Press, 1984.

In an article "Tests in the N.P.L. Electric Tank of a 4:1 Axi-symmetrical Diffuser Having a Discontinuity in the Wall Velocity" by F. Cheers, and W. G. Rayner, published 1950 by "London: His Majesty's Stationary Office", there is disclosed a 4:1 axi-symmetrical diffuser which has a single velocity discontinuity in the surface. Such configuration is shown in both FIGS. 1 and 2 of this paper, where there is an upstream section of smaller diameter which expands in a relatively short axially length to a greater diameter in the downstream direction.

Also, there is a report entitled "An Improved Design Method and Experimental Performance of Two Dimensional Curved Wall Diffusers" by Tah-Teh Yang, W. G. Hudson and Ali M. El-Nashar of Clemsen University. This is a NASA report designated CR 121024, having a report date of Nov. 20, 1972. This report describes three different two dimensional diffusers, a so-called Griffith Diffuser shown in FIG. 12, a "dump diffuser" shown in FIG. 16, and a "cusp diffuser" shown in FIG. 17. These were constructed so that the two side walls were essentially planar, and there was boundary layer suction along these two sidewalls. The upper and lower walls have an upstream smaller depth dimension, and these diverge upwardly and downwardly in a relatively short axial length to a downstream location where is a substantially greater depth dimension. Also, there are upper and lower section slots provided in the transition region, and attention is called particularly to FIG. 12 where the "Griffith" diffuser is shown.

A search of the patent literature has disclosed a number of patent which are noted below. These are as follows:

U.S. Pat. No. 2,709,917 (Bruynes) shows a transonic wind tunnel where the transonic velocity in the test section is accomplished as follows. There is a fan which directs the air into a converging passageway upstream of the test section, where there is a tangential slot through which air flows along the boundary layer in a downstream direction at the upstream end of the test section. The wall 22 in the test section has a diameter greater than that of the air at the downstream end of the converging inlet. Air at the downstream end of the test section is drawn out as suction air 26 in a circumferential slot. Also, further suction air is drawn out of the air stream at a circumferential location 50 downstream of the circumferential slot 26.

U.S. Pat. No. 2,729,974 (Lee et al) shows a transonic wind tunnel where there is a converging inlet at the upstream end of the test section, and just downstream of this converging inlet, there is a tangential slot through which air is injected in a downstream area into the boundary layer of the air stream. In the test section itself, the circumferential wall 18 is formed as a porous layer, and there is suction boundary layer to draw the air into a circumferential chamber. Further, there is a pump 30 which draws the air out of the chamber 20 to inject it into the tangential slot to flow into the air stream.

U.S. Pat. No. 2,948,148 (D'Anferville et al) discloses a supersonic wind tunnel which can be operated at variable Mach numbers. The patent states that the common way of changing the Mach number in a supersonic wind tunnel is to change the cross-sectional area at an upstream location where the air is going from sub-sonic to supersonic. In this patent, the same effect is accomplished by injecting air into the air stream at the necked down location so as to aerodynamically restrict the flow at that area.

U.S. Pat. No. 3,000,401 (Ringles) discloses a boundary layer control device in the form of a cusp formed at an intermediate location. Upstream of the cusp, there is an aerodynamic surface which is contoured so that the air flowing from location A to C is accelerating slightly or at least is not substantially reduced at any point so that there is no boundary layer separation. This aerodynamic surface ends in a sharp circumferential edge facing in a downstream direction and away from the airflow, and there is, in cross-sectional configuration, a recess formed in a generally circular curve which extends from the sharp edge in a curve to join to a downstream aerodynamic surface. The effect is that within the recess, the air rotates about a fluid center at F and the airflow over the airfoil contour from A to C remains laminar. When this device is used in an airfoil, it is stated that there can be greater angles of attack, without the air separating over the aerodynamic surface from location A to C. Also, in column 4, beginning at line 26, the patent states that "The cusp effect described here can also be applied wherever a flow is to be led from a lower to a higher pressure or vice versa, as for example, to shorten the diffuser of a wind tunnel, or, in ducts and pipes as illustrated at 14 in FIG. 3 to prevent separation of the flow at turns and bends."

U.S. Pat. No. 3,049,005 (Frenzl) shows a wind tunnel where compressed air is taken from a tank 4 and fed through an ejector 3 which draws air from a testing chamber 1. The air from the ejector pump 3 along with the air drawn from the chamber 1 has a recirculating path 8, 9 and 10 back to convergent-divergent discharge nozzle 11. Downstream of the ejector pump 3 there is a second ejector pump 16 positioned downstream of the first ejector pump 3.

U.S. Pat. No. 3,981,144 (Milling et al) shows a dual stage supersonic diffuser which is designed to produce an effect similar to the change in the flow cross-section of a variable throat area diffuser. The diffusing element of the first stage is aligned perpendicularly to the second stage. The diffuser vanes of the first stage are inclined at an angle to the direction of flow so that the flow field between the first stage and the second stage changes from the conditions before diffuser starting to the conditions after diffuser starting.

U.S. Pat. No. 3,998,393 (Petty) shows a supersonic diffuser for use with a gas dynamic laser having a multichannel shock duct diffuser with outer duct walls and inner duct walls forming an inner duct channel and two outer duct channels. In FIG. 8 and following, there are shown various separation point stabilizers, with FIG. 14 showing a modified version where there is a separation point at 51 which points in a downstream direction, with this being undercut as at 53 to form a recess having at least partially a curved configuration.

U.S. Pat. No. 4,515,524 (Fisher) shows a hydraulic turbine where there is a draft tube having a first diverging section to receive the water pumped from the turbine, and a further downstream section having a greater angle of divergence so that separated flow could occur. There are suction openings in the second section which draw off water and direct these back to an upstream nozzle location in the first diverging section, so as to alleviate separation In the second section.

SUMMARY OF THE INVENTION

The wind tunnel of the present invention comprises a test section defining a test passageway, and also a fan section arranged to receive air flow from the test section and to drive the air flow to the test section in a recirculating pattern. There is passageway means interconnecting the test section and the fan section, this comprising a first passageway section directing air flow from the test section to the fan section, and a second passageway section directing air from the fan section to the test section.

There is a diffuser means located in the passageway means defining a diffuser passageway means to receive air flow from one of the test section and the fan section. This diffuser means reduces velocity of the air flow for delivery of reduced velocity air flow to the other of the test section and the fan section.

The diffuser means comprises a first diffuser section having a first peripheral wall means defining a first circumferential surface having a first vertical dimension and a first horizontal dimension and having a first cross-sectional area of a lesser equivalent diameter.

The diffuser means further comprises a second diffuser section having a second peripheral wall means having a second inside circumferential surface having a second vertical dimension and a second horizontal dimension which are greater than said first vertical and said first horizontal dimension, respectively, and having a second cross-sectional area of a greater equivalent diameter.

The diffuser means comprises a third intermediate transition wall means which joins to a downstream end of the first wall means and to an upstream end of said second wall means. The third wall means defines a third transition passageway portion which expands both vertically and horizontally in a downstream direction.

There is a peripheral suction slot means adjacent to an upstream portion of the third wall means and extending substantially around the upstream portion of the third wall means. There is also air suction power means to draw off boundary layer air into the suction slot means.

In the preferred form, there is also suction air outlet means positioned at a location downstream of the peripheral slot means and arranged to discharge air flow into the passageway means at a location downstream of the suction slot means. There is also by-pass passageway means positioned to receive air flow from the suction slot means and deliver the air to the suction inlet means, with the air suction power means causing air flow through the by-pass passageway means.

Desirably, the suction air outlet means comprises tangential flow means positioned to discharge the air flow in a downstream direction at a passageway wall location. Desirably, the tangential flow means is located proximate the second peripheral wall means.

In the preferred design, the diffuser means has equivalent diameters at three lengthwise locations, namely a first equivalent diameter at an inlet location of the first diffuser section, a second equivalent diameter at a downstream end of the second diffuser section, and a third equivalent diameter immediately upstream of the peripheral suction slot means.

The diffuser means has a total length dimension (L) extending from the location of the first equivalent diameter to the location of the second equivalent diameter, and an initial length dimension ($L_s$) extending from the location of the first equivalent diameter to the location of the third equivalent diameter.

The ratio of the initial length dimension ($L_s$) to the initial diameter $D_1$ is between about one and one and one half (i.e. 1.5), with a tolerance range of one half of one at a lower limit and double one and one half at an upper limit. More desirably, this tolerance range is between one third below one, and three quarters above one and one half, and more desirably ten percent below and fifteen percent above one and one half.

The overall length (L) of the diffuser section is about 2.5 times the initial equivalent diameter ($D_1$), within a tolerance range of one half of 2.5 $D_1$ to two times 2.5 $D_1$. More desirably, this tolerance range is between about two thirds times 2.5 $D_1$ and one and one half times 2.5 $D_1$. A more preferred range is between ten percent above and ten percent below 2.5 $D_1$.

The ratio of the slot entry equivalent diameter $D_3$ to the initial equivalent diameter $D_1$ is about 1.15, within a tolerance range from about one to about one and one half times 1.15.

The suction slot means has an axial slot dimension (S), and flow into the intermediate diffuser section has a boundary layer thickness dimension ($\delta$) wherein the slot width dimension is calculated in accordance with the following formula:

$$S = (\text{½ to 1}) \times (\delta) \times (A_2/A_1)$$

where
$A_1$ is the cross sectional area at $D_1$
$A_2$ is the cross sectional area at $D_2$
wherein (S) is within a tolerance range of one half of a value derived from said formula, to within twice of a value derived from said formula, more preferably within a tolerance range of two thirds of the value derived from said formula to one and one half times the value derived from said formula, and more desirably within about ten percent above and below the value derived from said formula.

Desirably two diffuser means are provided, one downstream of the test section and one downstream of the fan section. If the fan section has a center body, then a peripheral suction slot means can be provided in the center body at the upstream end of the intermediate diffuser section.

Other features will become apparent from the following detailed description.

DESCRIPTION OF THE PREFERRED EMBODIMENT

As indicated previously, FIGS. 1 through 4 are presented to show prior art configurations incorporating certain concepts by which boundary-layer laminar flow can be achieved, with FIGS. 1A, 1B, 2A and 2B relating to airfoil configurations, and FIGS. 3A, 3B and 4 relating to use of similar concepts in surfaces of revolution. Since these are discussed in the prior text under "Background Art", there will be no discussion of these herein.

Figure 5:
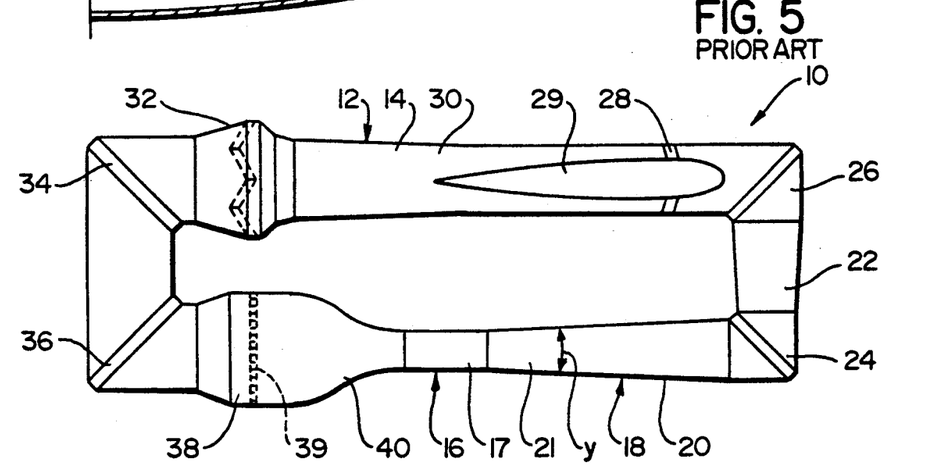
FIG. 5 is a somewhat schematic view, showing in longitudinal section a prior art transonic wind tunnel having relatively long diffuser sections commonly used in such windtunnels.

FIG. 5 is a somewhat schematic view of a prior art wind tunnel, incorporating diffuser sections that are common in such wind tunnels. It is believed that a clearer understanding of the present invention can be achieved by first describing in general the structure and operation of such a prior art wind tunnel. After that, there will be a more detailed discussion a wind tunnel incorporating the present invention.

With further reference to FIG. 5, there is shown a prior art wind tunnel 10 where there is a structure generally designated 12 defining a continuous passageway 14 through which the air in the wind tunnel circulates. There is a test section 16 having a passageway portion 17 which has a relatively smaller cross-sectional area and through which the air flows at a relatively high velocity. In a typical transonic wind tunnel (for which the present invention is particularly adapted) the air velocity generated in the test section passageway 17 could be between Mach 0.1 to 1.3. Downstream of the test section 16, there is a first diffuser section 18 which comprises a surrounding sidewall 20 which entirely surrounds and defines a diffuser passageway portion 21 and which has a generally frusto conical configuration. Such conventional conical diffusers 18 without active boundary-layer control generally are (as indicated previously) limited to included angles (indicated at "y") between five and seven degrees. The reason for this is that the function of this diffuser section 18, is to decelerate the flow from its maximum velocity and to recover as much as possible the original kinetic energy In the form of increased pressure. If this is to be done, it is necessary to prevent separated flow along the sidewall 20.

Immediately downstream of the first diffuser section 18, there is a second passageway section 22 leading from the exit end of the first diffuser section 18 at right angles thereto as at 24. The flow from the second passageway section 22 makes a second right angle turn at 26 and is led into the main drive fan 28, having a center body 29. The air from the main drive fan 28 flows into the fan diffuser section 30, which is configured substantially the same as the first diffuser section 18, and which functions in substantially the same manner.

The flow from the fan diffuser section 30 in turn flows through a cooling section 32 to remove the heat added to the air due to the continuing recirculation thereof. The flow from the cooling section 32 goes through another pair of right angle turns at 34 and 36 and thence into a settling chamber 38. This settling chamber 38 can be provided with a flow straightening device, which could be, for example, a honeycombed section 39 defining elongate passageways aligned with the direction of flow. The flow from the settling chamber 38 goes into a converging passageway section 40 to then flow into the test section 16.

As described previously herein under the section entitled "Background Art" to a large extent the diffuser sections dictate the overall tunnel circuit length. Two prior art solutions which were discussed previously herein and which relate directly to boundary-layer control in a diffuser in a wind tunnel are able to shorten the circuit length. However, these have other problems which are described earlier herein. It was with the foregoing in mind that the present invention was conceived.

Figure 6:
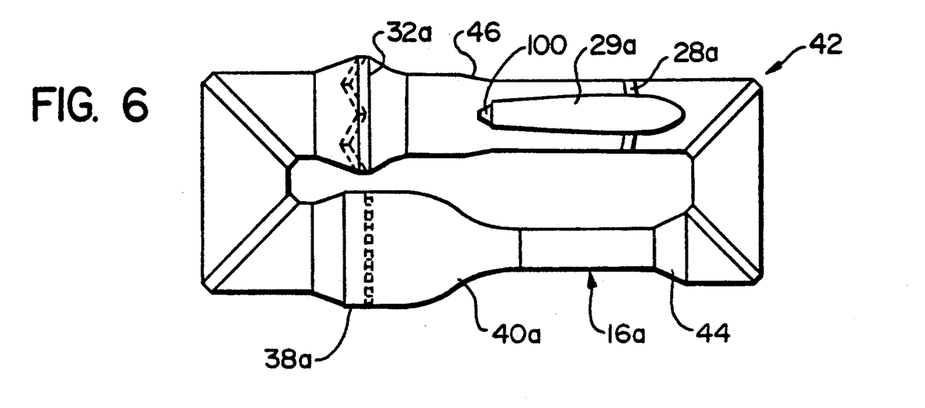
FIG. 6 is a schematic view similar to FIG. 5, showing in longitudinal section a wind tunnel incorporating the teachings of the present invention.

In FIG. 6, there is shown a wind tunnel 42 incorporating the concepts of the present invention. Components of the wind tunnel 42 which are, or may be, similar to components of the prior art configuration shown in FIG. 5 will be given numerical designations corresponding to such similar components, with an "a" suffix distinguishing those components which are incorporated in the present invention.

In the wind tunnel 42 of the present invention, shown in FIG. 6, there is a test section 16a, a main drive fan 28a, a cooling section 32a, a settling chamber 38a, and a converging passageway section 40a leading into the test section 16a.

The wind tunnel 42 of the present invention differs from that shown in FIG. 5 primarily in the utilization of an improved wind tunnel diffuser design, one of which is shown at 44 immediately downstream of the test section 16a, and a second such diffuser section shown at 46 just downstream of the main drive fan 28a. Since the two diffuser sections 44 and 46 are substantially the same, only the first diffuser section 44 will be described in detail herein.

Figure 7:
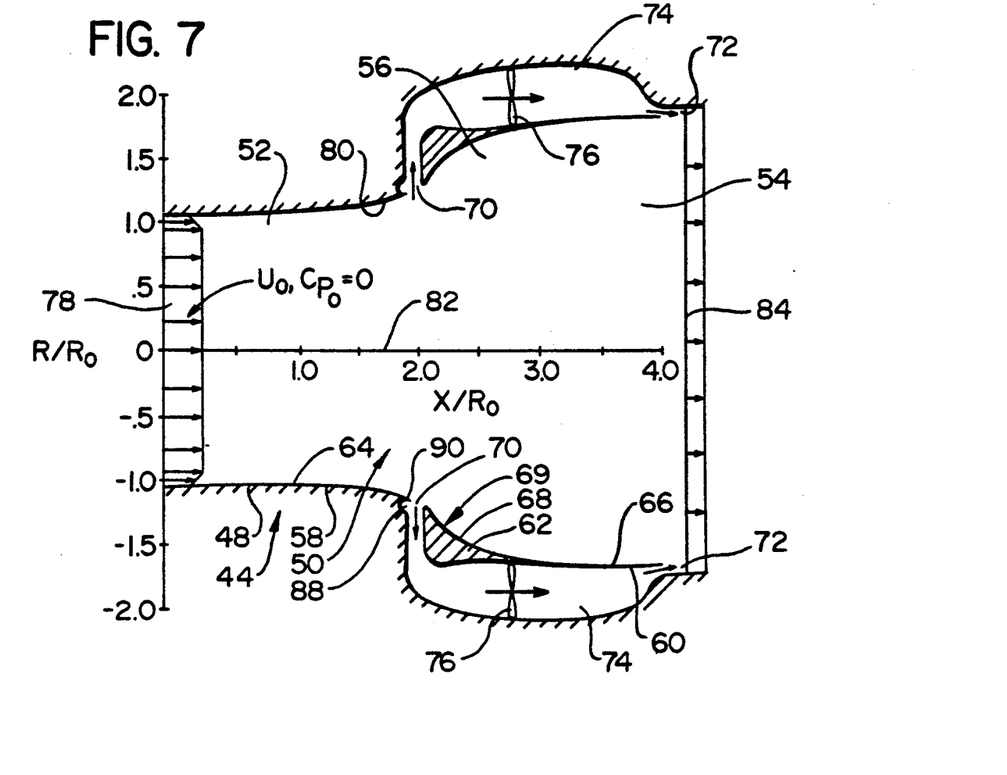
FIG. 7 is a longitudinal sectional view, drawn to an enlarged scale, showing the diffuser sections of the wind tunnel of the present invention shown in FIG. 6, at a location just downstream of the test section.

Reference is now made to FIG. 7 which shows the diffuser section 44 drawn to an enlarged scale. This diffuser section 44 comprises structure 48 defining a diffuser passageway 50. This passageway 50 can, in terms of function, be considered to comprise a first upstream passageway portion 52 of a relatively smaller circular cross sectional area, a second downstream passageway portion 54 of a relatively greater circular cross sectional area, and a third intermediate transition passageway portion 56 which joins the two passageways 52 and 54. These three passageway portions 52, 54, and 56 are in turn defined by circumferential diffuser wall sections 58, 60 and 62, respectively, each of which has interior passageway defining surfaces 64, 66 and 68, respectively, each being circular in cross sectional configuration.

There is a boundary-layer control assembly 69 which comprises structure defining a circumferential suction inlet or slot 70 adjacent to the upstream portion of the intermediate transition surface, and a circumferential tangential blowing outlet 72 at the downstream end of the downstream surface portion 66. The suction inlet or slot 70 and the tangential outlet 72 are interconnected by a circumferential annular by-pass passageway 74, and suitable by-pass fan means 76 is provided in the by-pass passageway 74. It is to be understood that the by-pass passageway 74 and the fan means are shown somewhat schematically, and these can be configured in different ways. For example, the by-pass passageway 74 could be a plurality of cylindrical ducts with individual fans 76 therein. However, with the suction inlet 70 and the tangential outlet 72 being substantially continuous around the entire periphery of the passageway 50, the passageways 74 and fan 76 should be arranged so that there is substantially uniform flow through the suction inlet 70 and out the tangential outlet 72.

It is believed that a better understanding of the present invention will be achieved by now describing in general the operation of the diffuser 44 of the present invention relative to the pattern of airflow, and then describing further specifics of the structural configuration.

To review the overall operation, the flow at 78 into the upstream end of the diffuser section 44 is substantially uniform across the major cross-sectional area, with there being something of a velocity gradient adjacent to the upstream interior surface 64. In the event that the test section 16a has a square or rectangular cross-sectional configuration, then there will be a transition area upstream of the diffuser 44 where the interior surface of the passageway blends into a circular cross-sectional configuration at the upstream end of the first diffuser passageway portion 52. As the flow in the upstream passageway portion 52 moves downstream, the velocity of the flow of air rather close to the passageway surface portion 64 remains substantially constant and even increases to a small extent as it moves downstream, due to a small degree of outward curvature (indicated at 80) near the downstream end of the first passageway section 52.

As the flow in the diffuser 44 continues into the transition passageway portion 56, the air flow adjacent to the wall surface at 68 begins a rather abrupt change in direction as it begins to flow radially outwardly from the passageway centerline (indicated at 82). However, just as the air adjacent to the wall surface begins this abrupt change of direction, it moves adjacent to the circumferential suction slot 70, and the boundary-layer air is sucked in to this slot or inlet 70. The effect of this is to prevent separation of the flow adjacent to the intermediate surface 68. There is an abrupt increase in pressure as the velocity of this air adjacent to the surface 68 decreases in a very short axial distance (see FIG. 8), as it moves through the transition section 56. Then the flow adjacent to the downstream surface 66 remains at a substantially constant velocity and pressure until it reaches the exit plane (indicated at 84) where the air flow is leaving the diffuser section 44 with a substantial increase in pressure and a substantial decrease in velocity, in comparison to the air entering the diffuser section 44. Also, it can be seen that pressurized air is flowing outwardly through the circumferential tangential outlet 72, this having the further effect of energizing the boundary-layer.

Figure 8:
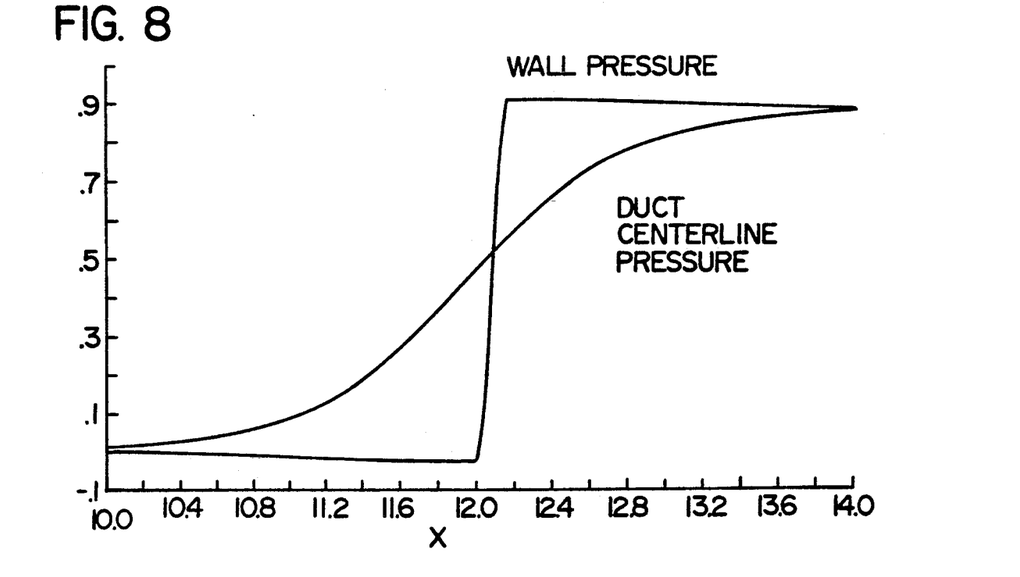
FIG. 8 is a pressure distribution curve giving the pressures along a lengthwise axis of the diffuser section shown in FIG. 7, with one curve showing the pressure along the wall of the diffuser section, and the other curve showing the pressure at the centerline of the diffuser.

With further reference to FIG. 8, let us now examine the flow characteristics of the air along the longitudinal center axis 82 of the diffuser passageway 50. It can be seen that as the air flow at a center location moves beyond the upstream flow area 78 the pressure begins to rise, which means that there is a corresponding decrease in axial velocity. There is a continued gradual decrease in velocity in air flow along the centerline 82 through the transition area, and just beyond the transition area the air flow at the longitudinal center axis 82 actually has a higher velocity than the air flow at the wall surface 66 at the same axial location. By the time that the total air flow reaches the exit plane 84 of the diffuser 44, the components of the air flow which entered at the upstream planar location 78 along an even line (comparing this to a phalanx of marching soldiers) has now evened out its ranks again at the downstream exit plan 84. The result is that there has been a substantial increase in static pressure at the downstream end of the diffuser, and a corresponding substantial decrease in axial velocity, with this being accomplished with a relatively low loss of energy, due to the alleviation of potential turbulent flow in the rapidly expanding transition passageway area 62.

Figure 9:
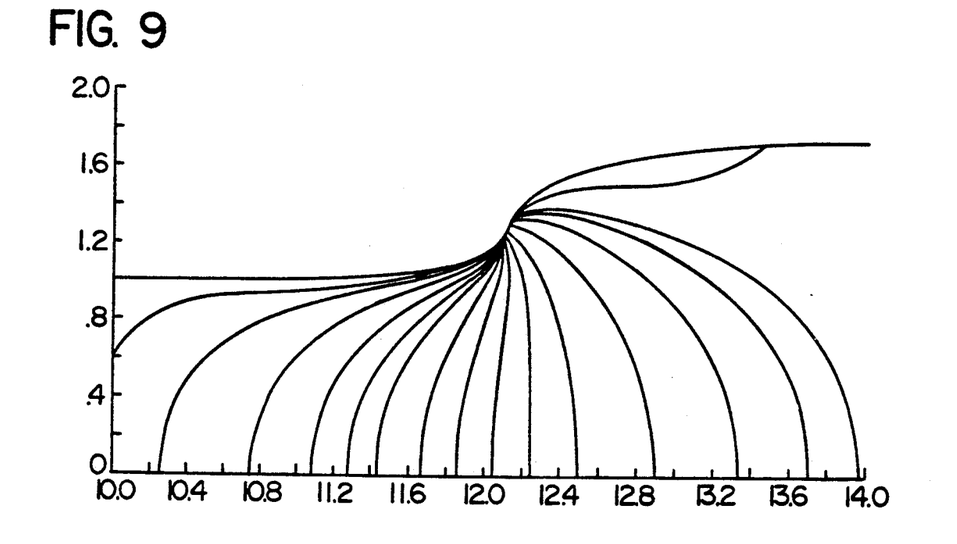
FIG. 9 is a graph illustrating the wall contour of the diffuser of the present, invention, and also showing pressure isobars relative to stations along the axial length of the diffuser, and axial distance to the diffuser centerline.

Reference is now made to FIG. 9 which presents on the vertical axis the ratio of the distance from the centerline axis 82 to the radius and presents along the horizontal axis the axial location. The isobars are plotted, and it can be seen that the pressure changes closer to the center axis are more gradual along the axial length then those which are closer to the surface of the passageway 50.

Figure 10:
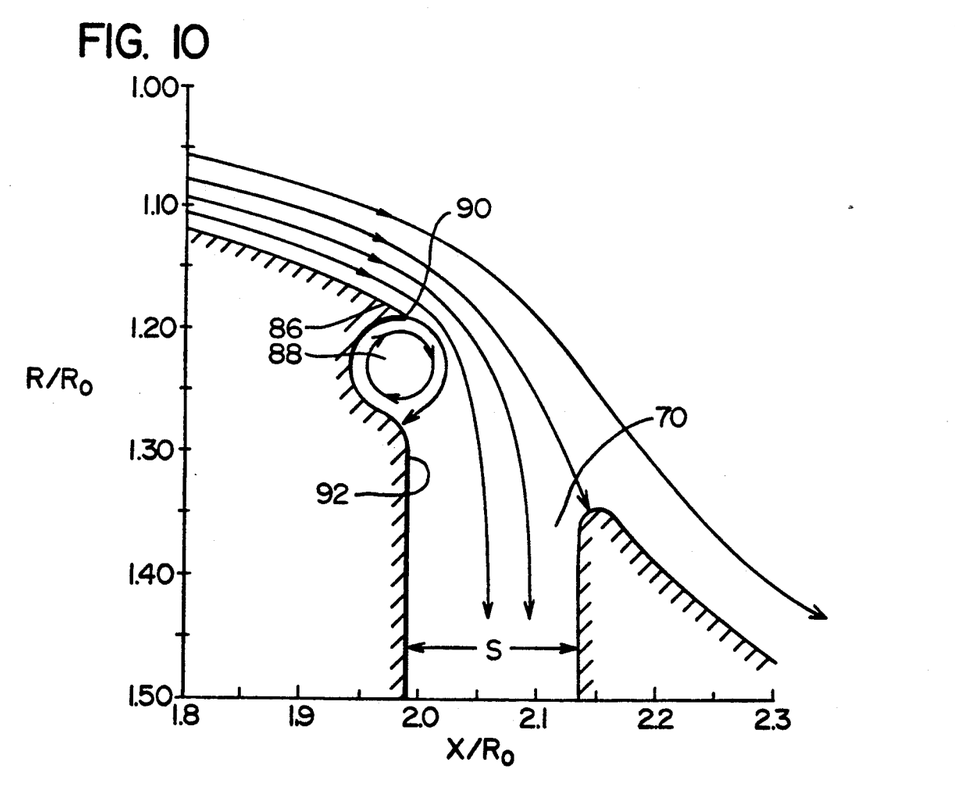
FIG. 10 is a sectional view, drawn to an enlarged scale, showing a portion of the diffuser at the suction slot, with the sectional view taken transversely to the circumference of the slot.

To describe another feature of the present invention, reference is made to FIG. 10 which is an enlarged view of the area adjacent the inlet 70. It can be seen that the circumferential suction inlet 70 is formed at its upstream surface with a circumferential "cusp" 86. In circumferential cross-sectional configuration, this cusp 86 can be seen to comprise a circumferential recessed area 88 formed at an upstream circumferential surface portion defining the suction inlet 70. More particularly, this recess 88 is formed in a manner that there is a relatively sharp circumferential edge 90 at the downstream end of the upstream portion 64, and the recess 88 curves in a substantial semi-circle in peripheral cross-sectional configuration to blend back into the main wall 92 that defines the upstream surface of the suction inlet 70.

Figure 11:
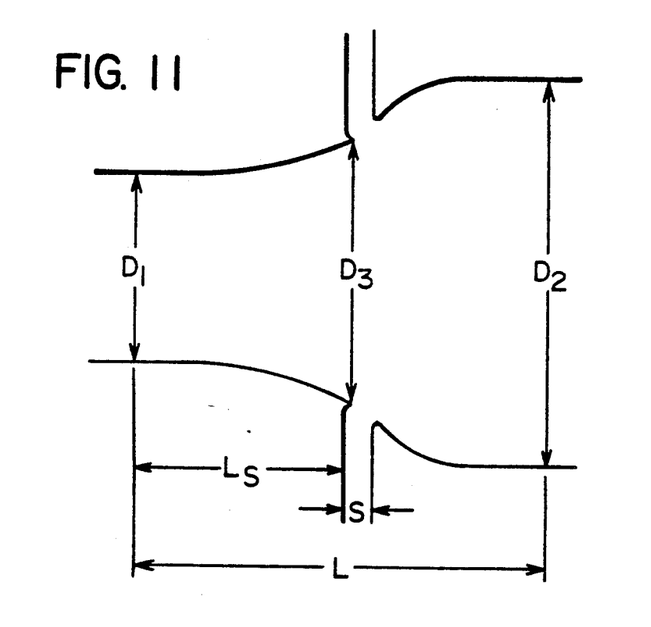
FIG. 11 is a schematic view similar to FIG. 7, showing dimensional relationships of the inside contour of the diffuser section.

Reference is now made to FIG. 11 to disclose further detailed design information regarding the present invention. FIG. 11 is similar to FIG. 7, but is somewhat simplified in that it simply shows the wall surface contours of the diffuser 44.

Three diameter dimensions are indicated. First, there is the diameter ($D_1$) at the inlet of the diffuser passageway portion 52, which is immediately downstream of the test section. The location of the diameter $D_1$ is determined as being that location where the uniform flow from the test section begins to deviate from uniform flow as indicated in the graphs of FIGS. 8 and 9. Second, there is the exit diameter ($D_2$) which is at the exit plane 84 of the diffuser section 44, this being the location where the flow returns to a uniform flow. Then there is a third diameter ($D_3$) at the upstream edge of the slot 70 (i.e. the diameter at the location of the circumferential edge 90).

In the preferred configuration, the cross sectional configuration of the diffuser 44 at these diameter locations would be circular. However, in the event that the cross sectional configuration at any such location is not circular, then the diameter dimension would be considered to be an equivalent diameter. For example, if the diameter at the end of the test section were not circular, then the diameter $D_1$ would be calculated by the following formula:

$$D_2 = D_1 \sqrt{\frac{A_2}{A_1}}$$

where $A_1$ is the cross sectional area at $D_1$
$A_2$ is the cross sectional area at $D_2$ Then, there is a total length dimension L which is the axial length from the location of $D_1$, to the location of diameter $D_2$. There is also shown the length dimension $L_s$, which is the distance from the location of the initial diameter $D_1$ to the location of the diameter $D_3$ at the upstream edge of the slot 70.

The distance from the location of the diameter $D_1$ to the location of the diameter $D_3$ (this distance being indicated as $L_s$) should be at least approximately equal to the initial diameter $D_1$, and desirably equal to one and one-half times $D_1$. The dimension $L_s$ is dependent to some extent on the ratio of $A_2$ to $A_1$. In a typical example, this $A_2/A_1$ ratio would be about three, and for that ratio, an $L_s$ of about 1.5 $D_1$ is, in accordance with present information, close to an optimum invention. However, if the $A_2/A_1$ ratio increases to a larger number, the pressure effects would likely be felt further upstream, which would move the location of the initial diameter $D_1$ further upstream, and thus increase the length $L_s$ to somewhat greater than 1.5 $D_1$.

With regard to the overall length (L) this is ideally determined by inviscid flow analysis. For an area ratio of $A_2$ to $A_1$ of about 3, the overall length (L) would be equal to about 2.5 $D_1$. The overall length dimension (L) could be made shorter or longer than the optimized length, but if it is significantly shorter or longer, this would likely require a substantial increase in the suction power required into the slot 70. Also, a greater $A_2$ to $A_1$ ratio would increase the length (L).

In general, the numerical relationships given in the two preceding paragraphs could, within the broader scope of the present invention, be either increased to possibly double the given quantity or decreased by one-half, and within narrower ranges, be increased by one-half and decreased by one-third, and yet within a more preferred range, within ten (10) percent greater or less than the values given above.

With regard to the diameter ($D_3$) at the upstream edge of the lip 70, this is ideally determined so as to have only a slight pressure decrease ahead of the slot. For an area ratio of ($A_2$ to $A_1$) of about 3, the slot diameter ($D_3$) would be equal to about 1.15 times the initial diameter ($D_1$). If the slot entry diameter $D_3$ is smaller than optimum, it will cause a larger pressure decrease ahead of the slot, resulting in lower pressure in the slot, and more suction power would be required for the slot 70. On the other hand, if the diameter ($D_3$) is made larger than optimum, flow may separate ahead of the slot 70, and more suction power into the slot 70 would be required. As a minimum, the slot diameter ($D_3$) should be at least equal to $D_1$ and at a maximum possibly as high as one and one half times 1.115 $D_1$. Further, the surface contour upstream of the diameter ($D_3$) location should be properly designed for a favorable pressure curve.

With regard to the axial dimension of the slot (shown at "s" in FIG. 11), this is ideally determined by the thickness dimension of the boundary layer "$\delta$" (see FIG. 10) just upstream of the slot 70. This boundary layer thickness "$\delta$" will depend on the length of the test section and various operating conditions (Reynolds number Mach number, etc.). In general, the slot width dimension "s" would be obtained by the following formula:

$$S = (\tfrac{2}{3} \text{ to } 1) \times (\delta) \times (A_2/A_1)$$

The numerical value for the axial dimension (S) of the slot could be increased or decreased, within the broader scope of the present invention, to values possibly twice as great or one half as great than the given values, more desirably between one half greater or one quarter less, and more desirably within ten percent of the values given.

If the slot dimension S is too small, it may not be possible to get enough air through this slot 70. If the slot dimension S is too large, it may not be possible to get steady flow.

The second diffuser section 46 incorporates the basic operating principles of the diffuser section 44, and the outer wall contains a circumferential suction slot corresponding to suction slot 70. In addition, there is a further feature added because of the presence of a center body 29a. It would be noted that in the prior art configuration of FIG. 5, the center body 29 tapers radially inwardly in a downstream direction to end at a point. However, as a possible option, the downstream end of the center body 29a of the wind tunnel of the present invention terminates with a shorter axial length, and the aft end is provided with a circumferential slot 100 which will draw off the boundary layer air which flows along the outer surface of the center body 29a. Further, it is to be understood that the cross sectional area of the center body 29a would subtract form the total cross-sectional area at the upstream end of the diffuser, and this must be taken into account in designing the contour of the outer wall to obtain the desired ratios of the cross sectional areas at the locations along the axial length of the diffuser 46.

It is to be recognized that various modifications could be made to the present invention without departing from the basic teachings thereof.

What is claimed is:

1. A wind tunnel comprising:
   a. test section defining a test passageway;
   b. a fan section arranged to receive air flow from the test section and to drive said air flow to said test section and to drive said air flow to said test section in a recirculating pattern;
   c. passageway means interconnecting said test section and said fan section and comprising a first passageway section directing air flow from said test section to said fan section, and a second passageway section directing air flow from said fan section to said test section;
   d. a diffuser means located in said passageway means and defining a diffuser passageway means to receive air flow from one of said test section and fan section and to reduce velocity of said air flow for delivery of reduced velocity air flow to the other of said test section and fan section, said diffuser means comprising:
      i. a first diffuser section having a first peripheral wall means defining a first circumferential surface having a first vertical dimension and a first horizontal dimension and having a first cross-sectional area of a lesser equivalent diameter;
      ii. a second diffuser section having a second peripheral wall means defining a second inside circumferential surface having a second vertical dimension and a second horizontal dimension which are greater than said first vertical and said first horizontal dimension, respectively, and having a second cross-sectional area of a greater equivalent diameter;
      iii. a third intermediate diffuser section having a third intermediate transition wall means which joins to a downstream end of said first wall means and to an upstream end of said second wall means, said third wall means defining a third transition passageway portion which expands both vertically and horizontally in a downstream direction;
      iv. a peripheral suction slot means adjacent to an upstream portion of said third wall means and extending substantially entirely around said upstream portion of said third wall means and capable of receiving a substantial portion of upstream boundary layer air at said upstream portion;
      v. air suction power means to draw off said substantial portion of upstream boundary layer air into said suction slot means, with said slot means and said air suction power means being arranged so that sufficient boundary layer is removed into said slot means to inhibit separated flow downstream of said slot means;
      suction air outlet means positioned at a location downstream of said peripheral slot means and arranged to discharge air flow into said passageway means at a location downstream of said suction slot means;
      vii. a by-pass passageway means positioned to receive air flow from said suction slot means and deliver said air to said suction air outlet inlet means, with said air suction power means causing air flow through said by-pass passageway means.

2. The wind tunnel as recited in claim 1, wherein said suction air outlet means comprises tangential flow means positioned to discharge said air flow in a downstream direction at a passageway wall location.

3. The apparatus as recited in claim 2, wherein said tangential flow means is located proximate to said second peripheral wall means.

4. The wind tunnel as recited in claim 3, wherein:
   a. said diffuser means has equivalent diameters at three lengthwise locations, namely a first equivalent diameter ($D_1$) at an inlet location of said first diffuser section, a second equivalent diameter ($D_2$) at a downstream end of said second diffuser section, and a third equivalent diameter ($D_3$) immediately upstream of said peripheral suction slot means;
   b. said diffuser means has a total length dimension (L) extending from the location of the first equivalent diameter to the location of the second equivalent diameter and an initial length dimension ($L_s$) extending from the location of the first equivalent diameter to the location of the third equivalent diameter;
   c. the ratio of the initial length dimension ($L_s$) to the initial diameter ($D_1$) being between about one to one and one-half, within an $L_s$ to $D_1$ tolerance range of one half of one at a lower limit and double one and one half at an upper limit.

5. The wind tunnel as recited in claim 4, wherein said $L_s$ to $D_1$ tolerance range is between one third below one, and two thirds above one and one half.

6. The wind tunnel as recited in claim 5, wherein said $L_s$ to $D_1$ tolerance range is between about ten percent below one and fifteen percent above one and one half.

7. The wind tunnel as recited in claim 4, wherein the overall length (L) of the diffuser section is about 2.5 times the initial equivalent diameter ($D_1$), within an (L) tolerance range of one half of 2.5 ($D_1$) to two times 2.5 ($D_1$).

8. The wind tunnel as recited in claim 7, wherein said (L) tolerance range is between about two thirds times 2.5 ($D_1$) and one and one half times 2.5 ($D_1$).

9. The wind tunnel as recited in claim 4, wherein said (L) tolerance range is between about 10% below and 10% above 2.5 ($D_1$).

10. The wind tunnel as recited in claim 4, wherein the $D_3$ and $D_1$ ratio of the slot entry equivalent diameter (D3) to the initial equivalent diameter (D1) is about 1.15, within a $D_3$ to $D_1$ tolerance range of one and one and three quarters.

11. The wind tunnel as recited in claim 10 wherein the $D_3$ to $D_1$ tolerance range ratio is between ten percent above and ten percent below 1.15.

12. The wind tunnel as recited in claim 4, wherein:
  a. the overall length (L) of the diffuser section is about 2.5 times the initial equivalent diameter ($D_1$), within tolerance range of one half of 2.5 ($D_1$) to two times 2.5 ($D_1$);
  b. the $D_3$ to $D_1$ ratio of the slot entry equivalent diameter (D3) to the initial equivalent diameter (D1) is about 1.15, within $D_3$ to $D_1$ tolerance range of one and one and three quarters;
  c. said suction slot means has an axial slot dimension (S), and flow into said intermediate diffuser section has a boundary layer thickness dimension ($\delta$), wherein said slot width dimension is calculated according to the following formula, $$S = (2.3 \text{ to } 1) \times (\delta) \times A_2/A_1)$$

wherein
  ($A_2$) is the equivalent area at the location of diameter ($D_2$)
  ($A_1$) is the area at the location of the equivalent diameter ($D_1$)
wherein S is calculated within a tolerance of one half S to two times S.

13. The wind tunnel as recited in claim 12, wherein
  a. said (L) tolerance range is between about two thirds times 2.5 ($D_1$) and one and one half times 2.5 ($D_1$);
  b. the $D_3$ to $D_1$ ratio is between ten percent above and ten percent below 1.15;
  c. said tolerance is between one half greater or one quarter less than S.

14. A diffuser defining a diffuser passageway means to receive air flow and to reduce velocity of said air flow for delivery of reduced velocity air flow, said diffuser comprising:
  a. a first diffuser section having a first peripheral wall means defining a first circumferential surface having a first vertical dimension and first horizontal dimension and having a first cross-sectional area of a lesser equivalent diameter;
  b. a second diffuser section having a second peripheral wall means defining a second inside circumferential surface having a second vertical dimension and a second horizontal dimension which are greater than said first vertical and said first horizontal dimension, respectively, and having a second cross-sectional area of a greater equivalent diameter;
  c. a third intermediate diffuser section having a third intermediate transition wall means which joins to a downstream end of said first wall means and to an upstream end of said second wall means, said third wall means defining a third transition passageway portion which expands both vertically and horizontally in a downstream direction;
  d. a peripheral suction slot means adjacent to an upstream portion of said third wall means and extending substantially entirely around said upstream portion of said third wall means and capable of receiving a substantial portion of upstream boundary layer air at said upstream portion;
  e. air suction power means to draw off said substantial portion of upstream boundary layer air into said suction slot means with said slot means and said air suction power means arranged so that sufficient boundary layer is removed into said slot means to inhibit separated flow downstream of said slot means;
  f. suction air outlet means positioned at a location downstream of said peripheral slot means and arranged to discharge air flow into said passageway means at a location downstream of said suction slot means;
  g. a by-pass passageway means positioned to receive air flow from said suction slot means and deliver said air to said suction air outlet means, with said air suction power means causing air flow through said by-pass passageway means.

15. The diffuser as recited in claim 14, wherein there is:
  a. suction air outlet means positioned at a location downstream of said peripheral slot means and arranged to discharge air flow into said passageway means at a location downstream of said suction slot means;
  b. a by-pass passageway means positioned to receive air flow from said suction slot means and deliver said air to said suction inlet means, with said air suction power means causing airflow through said by-pass passageway means.

16. The diffuser as recited in claim 13, wherein said suction air outlet means comprises tangential flow means positioned to discharge said air flow in a downstream direction at a passageway wall location.

17. The diffuser as recited in claim 16, wherein said tangential flowing means is located proximate to said second peripheral wall means.

18. The wind tunnel as recited in claim 17, wherein:
  a. said diffuser means has equivalent diameters at three lengthwise locations, namely a first equivalent diameter ($D_1$) at an inlet location of said first diffuser section, a second equivalent diameter ($D_2$) at a downstream end of said second diffuser section, and a third equivalent diameter ($D_3$) immediately upstream of said peripheral suction slot means;
  b. said diffuser means has a total length dimension ("L") extending from the location of the first equivalent diameter to the location of the second equivalent diameter and an initial length dimension ($L_s$) extending from the location of the first equivalent diameter to the location of the third equivalent diameter;
  c. the ratio of the initial length dimension ($L_s$) to the initial diameter ($D_1$) being between about one to one and one-half, with any tolerance range of one half of one at a lower limit and double one and one half at an upper limit.

19. The diffuser as recited in claim 18, wherein the overall length (L) of the diffuser section is about 2.5 times the initial equivalent diameter ($D_1$), within an (L)

tolerance range of one half of 2.5 ($D_1$) two times 2.5 ($D_1$).

20. The diffuser as recited in claim 18, wherein the $D_3$ to $D_1$ ratio of the slot entry equivalent diameter ($D_3$) to the initial equivalent diameter ($D_1$) is about 1.15, within a tolerance range of one and one and three quarters.

21. A wind tunnel comprising:
   a. a test section defining a test passageway;
   b. a fan section arranged to receive airflow from the test section and to drive said air flow to said test section in a recirculating pattern;
   c. passageway means interconnecting said test section and said fan section and comprising a first passageway section directing air flow from said test section to said fan section, and a second passageway section directing air flow from said fan section to said test section;
   d. a diffuser means located in said passageway means and defining a diffuser passageway means to receive air flow from one of said test section and fan section and to reduce velocity of said air flow for delivery of reduced velocity air flow to the other of said test section and fan section, said diffuser means comprising:
      i. a first diffuser section having a first peripheral wall means defining a first circumferential surface having a first vertical dimension and a first horizontal dimension and having a first cross-sectional area of a lesser equivalent diameter;
      ii. a second diffuser section having a second peripheral wall means defining a second inside circumferential surface having a second vertical dimension and a second horizontal dimension which are greater than said first vertical and said first horizontal dimension, respectively, and having a second cross-sectional area of a greater equivalent diameter;
      iii. a third intermediate diffuser section having a third intermediate transition wall means which joins to a downstream end of said first wall means and to an upstream end of said second wall means, said third wall means defining a third transition passageway portion which expands both vertically and horizontally in a downstream direction.
      iv. a peripheral suction slot means adjacent to an upstream portion of said third wall means and extending substantially entirely around said upstream portion of said third wall means and capable of receiving a substantial portion of upstream boundary layer air at said upstream portion;
      v. air suction power means to draw off said substantial portion of upstream boundary layer air into said suction slot means, with said slot means and said air suction power means being arranged so that sufficient boundary layer is removed into said slot means to inhibit separated flow downstream of said slot means;
      vi. said suction slot means having an axial slot dimension (s), and flow into said intermediate diffuser section having a boundary layer thickness dimension ($\delta$), wherein said slot width dimension is calculated according to the following formula, $$S = (2.3 \text{ to } 1) \times (\delta) \times (A_2/A_1)$$

wherein ($A_2$) is the equivalent area at the location diameter ($D_2$), ($A_1$) is the area at the location of the equivalent diameter ($D_1$), and S is calculated with an (S) tolerance of one half S to two times S.

22. The wind tunnel as recited in claim 21, wherein said tolerance is within one-half greater and one-quarter less than S.

23. The wind tunnel as recited in claim 22, wherein said tolerance is between ten percent of S.

24. A wind tunnel comprising:
   a. a test section defining a test passageway;
   b. a fan section arranged to receive airflow from the test section and to drive said air flow to said test section in a recirculating pattern;
   c. passageway means interconnecting said test section and said fan section and comprising a first passageway section directing air flow from said test section to said fan section, and a second passageway section directing air flow from said fan section to said test section;
   d. a diffuser means located in said passageway means and defining a diffuser passageway means to receive air flow from one of said test section and fan section and to reduce velocity of said air flow for delivery of reduced velocity air flow to the other of said test section and fan section, said diffuser means comprising:
      i. a first diffuser section having a first peripheral wall means defining a first circumferential surface having a first vertical dimension and a first horizontal dimension and having a first cross-sectional area of a lesser equivalent diameter;
      ii. a second diffuser section having a second peripheral wall means defining a second inside circumferential surface having a second vertical dimension and a second horizontal dimension which are greater than said first vertical and said first horizontal dimension, respectively, and having a second cross-sectional area of a greater equivalent diameter;
      iii. a third intermediate diffuser section having a third intermediate transition wall means which joins to a downstream end of said first wall means and to an upstream end of said second wall means, said third wall means defining a third transition passageway portion which expands both vertically and horizontally in a downstream direction;
      iv. a peripheral suction slot means adjacent to an upstream portion of said third wall means and extending substantially entirely around said upstream portion of said third wall means and capable of receiving a substantial portion of upstream boundary layer air at said upstream portion;
      v. air suction power means to draw off said substantial portion of upstream boundary layer air into said suction slot means, with said slot means and said air suction power means being arranged so that sufficient boundary layer is removed into said slot means to inhibit separated flow downstream of said slot means;
      vi. said diffuser means being positioned to receive air flow from said fan section, and said fan section having a center body, a downstream portion of said center body having second peripheral suction slot means and air suction power means to draw boundary layer air adjacent to said center body.

25. A wind tunnel comprising:
a. a test section defining a test passageway;
b. a fan section arranged to receive airflow from the test section and to drive said air flow to said test section in a recirculating pattern;
c. passageway means interconnecting said test section and said fan section and comprising a first passageway section directing air flow from said test section to said fan section, and a second passageway section directing air flow from said fan section to said test section;
d. a diffuser means located in said passageway means and defining a diffuser passageway means to receive air flow from one of said test section and fan section and to reduce velocity of said air flow for delivery of reduced velocity air flow to the other of said test section and fan section, said diffuser means comprising:
 i. a first diffuser section having a first peripheral wall means defining a first circumferential surface having a first vertical dimension and a first horizontal dimension and having a first cross-sectional area of a lesser equivalent diameter;
 ii. a second diffuser section having a second peripheral wall means defining a second inside circumferential surface having a second vertical dimension and a second horizontal dimension which are greater than said first vertical and said first horizontal dimension, respectively, and having a second cross-sectional area of a greater equivalent diameter;
 iii. a third intermediate diffuser section having a third intermediate transition wall means which joins to a downstream end of said first wall means and to an upstream end of said second wall means, said third wall means defining a third transition passageway portion which expands both vertically and horizontally in a downstream direction;
 iv. a peripheral suction slot means adjacent to an upstream portion of said third wall means and extending substantially entirely around said upstream portion of said third wall means and capable of receiving a substantial portion of upstream boundary layer air at said upstream portion;
 v. air suction power means to draw off said substantial portion of upstream boundary layer air into said suction slot means, with said slot means and said air suction power means being arranged so that sufficient boundary layer is removed into said slot means to inhibit separated flow downstream of said slot means;
 iv. said first peripheral wall means expanding moderately in a downstream direction immediately upstream of said third intermediate diffuser section to obtain a desired pressure gradient along said first peripheral wall means.

26. A wind tunnel comprising:
a. a test section defining a test passageway;
b. a fan section arranged to receive airflow from the test section and to drive said air flow to said test section in a recirculating pattern;
c. passageway means interconnecting said test section and said fan section and comprising a first passageway section directing air flow from said test section to said fan section, and a second passageway section directing air flow from said fan section to said test section;
d. a diffuser means located in said passageway means and defining a diffuser passageway means to receive air flow from one of said test section and fan section and to reduce velocity of said air flow for delivery of reduced velocity air flow to the other of said test section and fan section, said diffuser means comprising:
 i. a first diffuser section having a first peripheral wall means defining a first circumferential surface having a first vertical dimension and a first horizontal dimension and having a first cross-sectional area of a lesser equivalent diameter;
 ii. a second diffuser section having a second peripheral wall means defining a second inside circumferential surface having a second vertical dimension and a second horizontal dimension which are greater than said first vertical and said first horizontal dimension, respectively, and having a second cross-sectional area of a greater equivalent diameter;
 iii. a third intermediate diffuser section having a third intermediate transition wall means which joins to a downstream end of said first wall means and to an upstream end of said second wall means, said third wall means defining a third transition passageway portion which expands both vertically and horizontally in a downstream direction;
 iv. a peripheral suction slot means adjacent to an upstream portion of said third wall means and extending substantially entirely around said upstream portion of said third wall means and capable of receiving a substantial portion of upstream boundary layer air at said upstream portion;
 v. air suction power means to draw off said substantial portion of upstream boundary layer air into said suction slot means, with said slot means and said air suction power means being arranged so that sufficient boundary layer is removed into said slot means to inhibit separated flow downstream of said slot means;
 vi. peripheral cusp means being formed at an upstream location of said peripheral slot means, so as to provide a peripheral recess in an upstream wall of said peripheral suction slot means.

27. The wind tunnel as recited in claim 1, wherein:
a. said diffuser means having equivalent diameters at three lengthwise locations, namely a first equivalent diameter ($D_1$) at an inlet location of said first diffuser section, a second equivalent diameter ($D_2$) at a downstream end of said second diffuser section, and a third equivalent diameter ($D_3$) immediately upstream of said peripheral suction slot means;
b. said diffuser means having a total length dimension (L) extending from the location of the first equivalent diameter to the location of the second equivalent diameter and an initial length dimension ($L_s$) extending from the location of the first equivalent diameter to the location of the third equivalent diameter;
c. the ratio of the initial length dimension ($L_s$) to the initial diameter ($D_1$) being between about one to one and one-half, within an $L_s$ to $D_1$ tolerance range of one half on one at a lower limit and double one and one-half at an upper limit.

28. The wind tunnel as recited in claim 27, wherein said $L_s$ to $D_1$ tolerance range is between on-third below one, and two-thirds above one and one-half.

29. The wind tunnel as recited in claim 28, wherein said $L_s$ to $D_1$ tolerance range is between about ten percent below one and fifteen percent above one and one-half.

30. The wind tunnel as recited in claim 27, wherein the overall length (L) of the diffuser section is about 2.5 times the initial equivalent diameter ($D_1$) to two times 2.5 ($D_1$).

31. The wind tunnel as recited in claim 30, wherein said (L) tolerance range is between about two-thirds times 2.5 ($D_1$) and one and one-half times 2.5 ($D_1$).

32. The wind tunnel as recited in claim 31, wherein said (L) tolerance range is between about 10% below and 10% above 2.5 ($D_1$).

33. The wind tunnel as recited in claim 27, wherein the $D_3$ to $D_1$ ratio of the slot entry equivalent diameter ($D_3$) to the initial equivalent diameter ($D_1$) is about 1.15, within a $D_3$ to $D_1$ tolerance range of one and one and three-quarters.

34. The wind tunnel as recited in claim 33, wherein the $D_3$ to $D_1$ tolerance range ratio is between ten percent above and ten percent below 1.15.

35. A diffuser defining a diffuser passageway means to receive air flow and to reduce velocity of said air flow for delivery of reduced velocity air flow, said diffuser comprising:
  a. a first diffuser section having a first peripheral wall means defining a first circumferential surface having a first vertical dimension and first horizontal dimension and having a first cross-sectional area of a lesser equivalent diameter;
  b. a second diffuser section having a second peripheral wall means defining a second inside circumferential surface having a second vertical dimension and a second horizontal dimension which are greater than said first vertical and said first horizontal dimension, respectively, and having a second cross-sectional area of a greater equivalent diameter;
  c. a third intermediate diffuser section having a third intermediate transition wall means which joins to a downstream end of said first wall means and to an upstream end of said second wall means, said third wall means defining a third transition passageway portion which expands both vertically and horizontally in a downstream direction.
  d. a peripheral suction slot means adjacent to an upstream portion of said third wall means and extending substantially entirely around said upstream portion of said third wall means and capable of receiving a substantial portion of upstream boundary layer air at said upstream portion;
  e. air suction power means to draw off said substantial portion of upstream boundary layer air into said suction slot means with said slot means and said air suction power means arranged so that sufficient boundary layer is removed into said slot means to inhibit separated flow downstream of said slot means;
  f. said suction slot means having an axial slot dimension (s), and flow into said intermediate diffuser section having a boundary layer thickness dimension ($\delta$), wherein said slot width dimension is calculated according to the following formula, $$S = (2.3 \text{ to } 1) \times (\delta) \times (A_2/A_1)$$

wherein
  ($A_2$) is the equivalent area at the location diameter ($D_2$);
  ($A_1$) is the area at the location of the equivalent diameter ($D_1$); and
  S is calculated with an (S) tolerance of one half S to two times S.

* * * * *